United States Patent [19]

Raver

[11] 4,367,823

[45] Jan. 11, 1983

[54] LOCKING DEVICE FOR CONNECTORS AND CLOSURES

[75] Inventor: Clarence L. Raver, Houston, Tex.

[73] Assignee: Thornhill-Craver Company, Houston, Tex.

[21] Appl. No.: 309,714

[22] Filed: Oct. 8, 1981

[51] Int. Cl.³ .............................................. B65D 45/00
[52] U.S. Cl. .................................. 220/316; 220/298; 285/90; 285/DIG. 20
[58] Field of Search ............... 220/298, 316, 288, 319; 285/90, DIG. 20, 93

[56] References Cited

U.S. PATENT DOCUMENTS

| 2,869,752 | 1/1959 | Hall | 220/298 |
| 2,943,869 | 7/1960 | Nordin | 285/90 |
| 3,990,605 | 11/1976 | Hanke et al. | 220/316 |

*Primary Examiner*—George T. Hall
*Attorney, Agent, or Firm*—Vinson & Elkins

[57] ABSTRACT

A locking device for connectors or closures which device prevents rotation of the means for holding a pair of members in engagement wherein the locking device includes a shield which overlies all surfaces on the locking device which might be engaged by a wrench to rotate the locking device while the closure is subjected to pressure. The locking device includes a pressure responsive member exposed to pressure within the closure which carries the shield and positions the shield to overlie all surfaces on the device on which a wrench may be placed and when there is no pressure differential across the pressure responsive member permits the shield to be moved to an out of the way position exposing a wrench surface.

10 Claims, 4 Drawing Figures

LOCKING DEVICE FOR CONNECTORS AND CLOSURES

This invention relates to a locking device for connectors, closures or like devices, in which a pair of members are sealingly connected to each other.

Locking devices are well known and have been extensively used with flange type connectors and closures which employ an interrupted thread arrangement for retaining a cover on a body or connecting two hubs together. These connectors have helical projections on the outside of one member and on the inside of a retaining ring which are employed to hold parts in sealing engagement. The parts of such structure are assembled by rotation of the retaining ring through a very small arc and by tightening bolts placed in suitable lugs on the face of the retaining ring and a hub or closure. This is a well known type of connection and such a connection and a type of locking device are shown in U.S. Pat. No. 2,869,752, the disclosure of which is incorporated herein in its entirety. Where two hubs are connected together, one hub is substituted for the blanking plug B in said patent. The two hubs may then be secured, as by welding, in two sections of pipe to provide a connector therebetween.

In these prior art types of devices a bleed port is uncovered when the bleeder plug is partially removed. The escape of fluid warns the workmen that pressure is still trapped within and that it is dangerous to disassemble the joint.

With some fluids it is objectionable to permit fluid passing through the bleeder plug to be exhausted to atmosphere.

It is further possible that a workman will not understand the significance of the escaping fluid and disassemble the connection while it is still under pressure.

It is therefore an object of this invention to provide a locking device which cannot be removed while the system is under pressure.

Another object is to provide a locking device of the removable plug type in which while the system is under pressure a sheath is positioned over the wrench surface and prevents a workman from engaging the wrench surface with a wrench.

Another object is to provide a locking device as in the preceding object in which while the system is under pressure the sheath overlies all surfaces on the device which might be engaged by a wrench and is rotatable relative to such surfaces so that the locking device cannot be removed so long as the system is under pressure.

Another object is to provide a locking device for a connector which when assembled and positioned in a connector presents an endwise surface which is flat and flush and cannot be engaged by a wrench and in which the circumferential surface of the device has a torque sheath which completely covers and is rotatable relative to every surface on the locking device which could be engaged by a wrench while the system is under pressure and which may be moved to a position exposing wrench flats when the system is not under pressure.

Another object is to provide a locking device in which wrench flats on the device are concealed by a sheath when the system is under pressure, which pressure is applied against a pressure responsive member in the device and in which a free floating piston is provided in the passageway subjecting the pressure responsive member to pressure within the connector and an incompressible fluid is provided between the free floating piston and the pressure responsive member to isolate the pressure responsive member from the fluids within the connector.

Other objects, features and advantages of this invention will be apparent from the drawings, the specification and the claims.

In the drawings wherein an illustrative example of this invention is shown and wherein like reference numerals indicate like parts:

The connector includes the conventional hub A to which a closure B is connected by a holding means, such as the retaining ring C. The closure B may be a solid cap or may be another hub which is attachable in the conventional manner to a pipe. The retainer ring C holds the members A and B in engagement and releases them upon rotation of the retainer ring C.

One of the two members, such as the closure B, has a threaded port 10 therein extending completely through the member B.

In accordance with this invention a means which includes a plug is provided in the port 10 and prevents rotation of the holding means C until the plug is removed.

Figure 1:
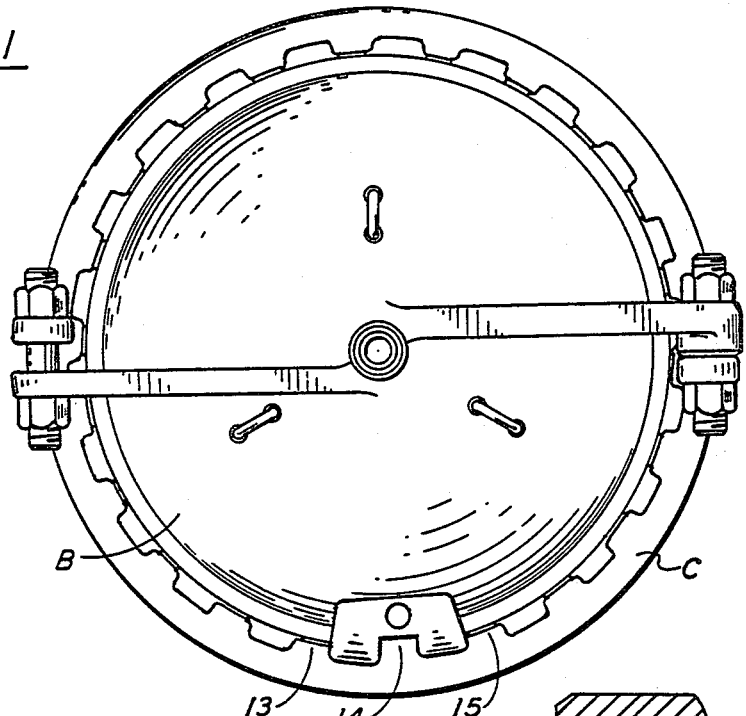
FIG. 1 is an end view of a closure such as a pipeline trap constructed in accordance with this invention.
Figure 4:
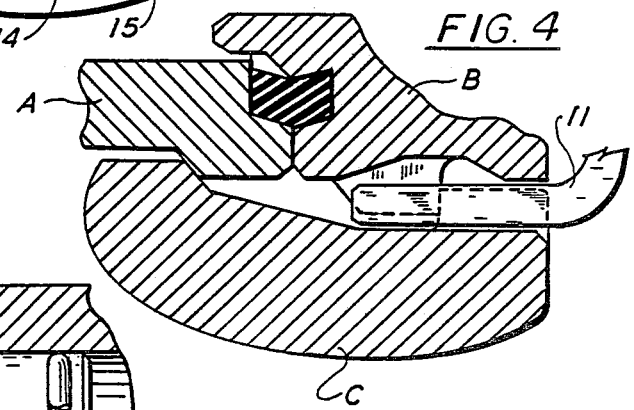
FIG. 4 is a fragmentary view in section through the connector.

The means for preventing rotation of the ring C includes a latch member 11 which extends into the space 12 between the interrupted lugs or threads on the closure B and the retainer ring C. As shown in FIG. 1, the member 11 substantially fills the space between the interrupted lugs 13 and 14, and 14 and 15 on the retaining ring C to thus prevent rotation of the retaining ring C until the member 11 is withdrawn from the space 12.

The member 11 is rotatably carried on the plug indicated generally at 16.

The plug 16 includes a plug body 17 having a reduced diameter cylindrical portion 18 on which the member 11 is rotatably mounted. A suitable washer 19 is positioned below the lock member 11 and a snap ring 21 maintains the washer in place.

The port 10 is threaded at 10a and the end of the plug body 17 has a threaded section 22 thereon which threadedly engages the thread system 10a.

A suitable seal, such as seal 23, is provided on a shoulder within the port 10 and a confronting shoulder 24 on the plug engages this seal to seal between the plug body and the port 10.

Extending from the threaded end of the plug body 17 is a passageway 25 which conducts fluid to a lateral passageway 26 which is covered by the seal 23 when the plug body is fully engaged in the port to prevent flow through the passageway 26. When the plug body is partially unscrewed, the seal 23 becomes ineffective and if pressure fluid is present within the system it can escape through the passageway 26 and warn that the system should not be disengaged due to the danger presented by fluid under pressure in the system.

The fluid passageway 25 also conducts fluid to the lateral passageway 27 and to the exterior of the plug body at an area remote from the threaded end of the plug body.

At the free end of the plug body 17 a reduced diameter threaded section 28 is provided. A cap 29 is threaded onto the threaded portion 28 of the plug body and is locked against rotation relative thereto by a lock screw 31.

A friction type drive plug 32 is carried in the cap 29 overlying the thread system 28 and the lock screw 31. The friction plug 32 has a tight fit in the recess 33 in the cap so that it is difficult to remove from the cap. The plug 32 is dimensioned to provide with the top of the cap surface 34 a flush surface so that no wrench surfaces are present on the top of the plug to be engaged by a wrench and permit removal or disassembly of the plug.

A suitable seal 35 seals between the plug body 17 and the cap 29.

The cap 29 has a depending skirt 36 which with the plug body 17 provides annulus 37.

A pressure responsive member is slidable within the annulus 37 and seals with the plug body 17 and the cap skirt 36. When the system is under pressure, pressure fluid from the passageway 25 and lateral passageway 27 is exerted against the pressure responsive member provided by piston 38 and the seal 39 carried thereon to urge the piston 38 away from the lateral passageway 27.

The annular piston 38 has a stop shoulder 41 thereon which engages the enlarged portion 42 of the plug body 17 to limit movement of the piston 38 away from the lateral passage 27. Wrench flats 43 are provided on body portion 42. It will be noted that the piston preferably overlies the wrench flats and prevents any possibility of a wrench being applied to these wrench flats to remove the plug body 17 so long as the annulus 37 is under pressure urging the piston away from the lateral passage 27. When the pressure differential across the piston 38 is removed it may be manually moved toward the lateral passage 27 to expose the wrench flats 43 and a wrench applied thereto to remove the plug body 17 from the port 10.

A certain amount of friction exists between the piston 38 and its seal 39 and the plug body 17 and cap 36. To prevent the possibility of a wrench being applied to the cap 29 or to the piston 38 to rotate and remove the plug body 17 from the port 10 through this frictional connection, the piston 38 and cap 29 are preferably protected against the wrench being applied thereto. Thus, it is preferred that a torque sheath 44 be rotatably carried by the piston 38 and be movable axially therewith. The torque sheath should completely overlie the piston 38, the wrench flats 43, and the cap 29 so that there is no circumferential surface present on the plug body, the piston or the cap which is not covered by the torque sheath when the system is under pressure. For this purpose the piston has an out turned flange 45 thereon which is received within a groove 46 extending inwardly from sheath 44 so that the torque sheath will move axially with the piston 38 but is free to rotate relative to the piston, the plug body and the cap and protects all parts of the piston body and cap from the application of a wrench while the system is under pressure. When the system is not under pressure the torque sheath may be moved upwardly by hand to the dotted line position carrying with it the piston 38 to expose the wrench flats 43 for the application of a wrench to remove the plug.

It will be appreciated that the lateral bleed port 26 will not be under pressure when the removal of the plug is begun. However, it is possible for pressure conditions within the system to change while the bleed plug is being removed and if such occurred fluid would escape through the passageway 26 and warn the operator that the plug should not be removed. For this reason while the lateral passageway 26 is not necessary, it is preferred.

Figure 3:
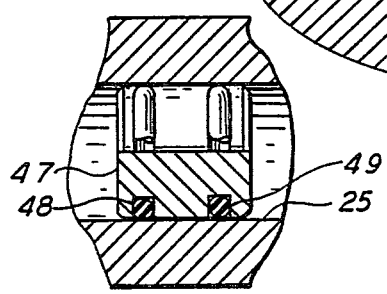
FIG. 3 is a fragmentary view of a modified form of the device of FIG. 2 in which a free floating piston is provided in the passageway within the plug body.

Under certain conditions it may be desirable to isolate the fluid within the port 10 from the seal 39. If such is desired, the floating piston shown at 47 in FIG. 3 may be provided within the passageway 25.

The piston 47 is provided with suitable seals 48 and 49. The passageway 25 and the annulus 37 are filled with an incompressible fluid, such as a light oil, to transmit the force of pressure within the port 10 to the piston while isolating the piston from the fluid within the port.

Figure 2:
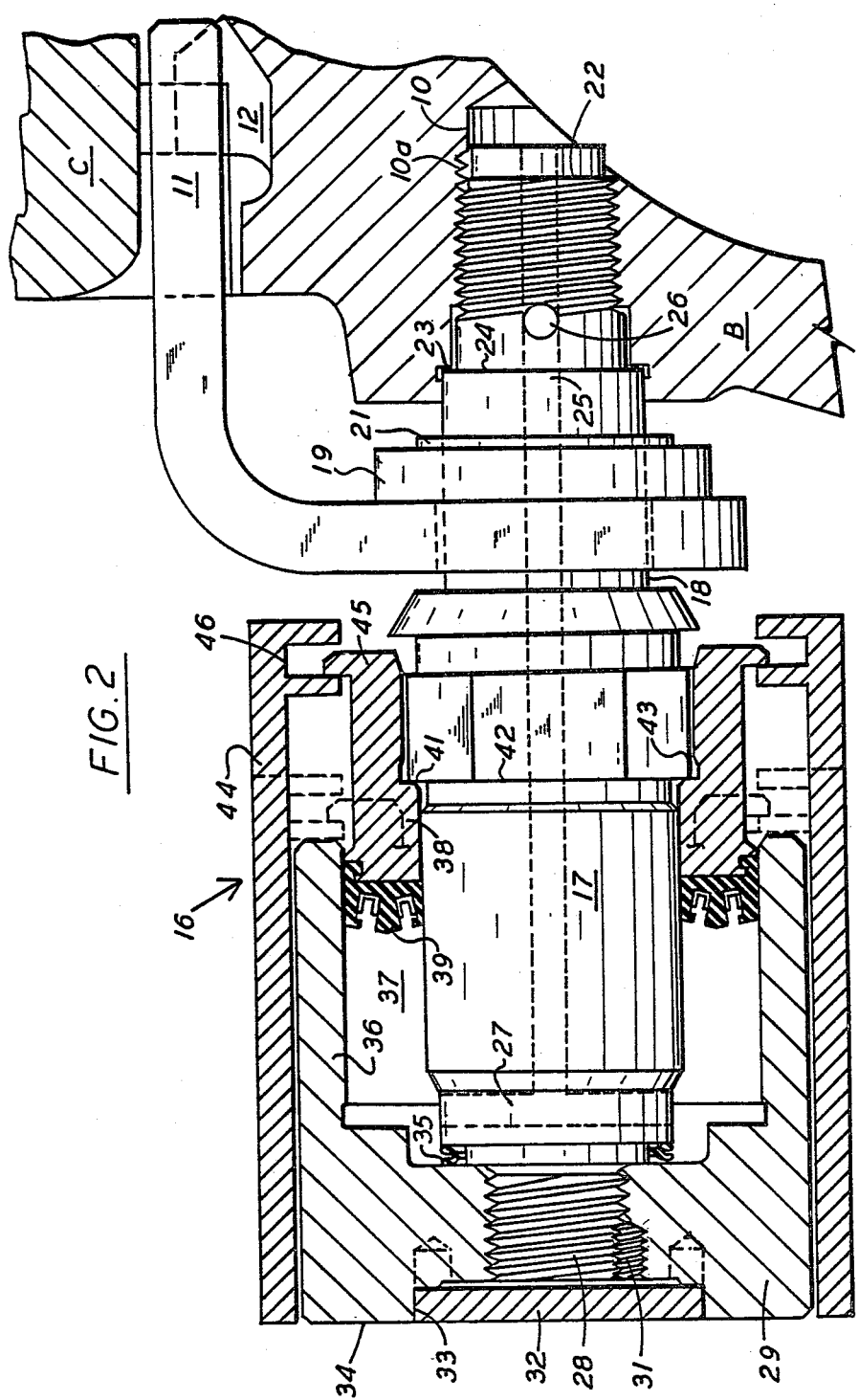
FIG. 2 is a cross-sectional view through a fragment of the closure of FIG. 1, illustrating the locking device with parts of the locking device shown in elevation and parts in cross-section.

In operation the pair of members A and B are fastened together with the holding means C and the latch 11 inserted as the plug is made up within port 10 to lock the ring in place and prevent disassembly of the members and the holding ring. While the system is pressurized, the pressure fluid is effective on the piston 38 to hold the torque shield 44 in position to overlie and prevent the application of a wrench to the piston 38, the plug body 17 or the cap 36. As the free end of the plug is flush and has no wrench surfaces and the torque shield is free to rotate, it is impossible for a workman to apply a wrench to the plug to remove it from the port 10 so long as pressure is present in the system to maintain the torque shield in the position shown in FIG. 2. When the pressure within the pair of members has been relieved and it is desired to disassemble the connection, the pressure differential across the piston 38 will have been relieved by depressurizing the members A and B and a workman may manually move the torque shield away from the closure B to expose the wrench flats 43 and remove the plug, together with the latch member 11 and permit disassembly of the holding ring and the pair of members.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A connector comprising, a pair of members adapted to sealingly engage each other, means for holding said members in engagement and releasing said members upon rotation of said means, a threaded port in one of said pair of members, means including a plug in said port preventing rotation of said holding means, a wrench surface on the plug, a pressure responsive member slidable relative to the plug, passage means in the plug exposing said pressure responsive member to pressure fluid in said port, and a sheath carried by said pressure responsive member and movable axially therewith, said pressure responsive member maintaining said sheath over said wrench surface when said port is pressurized, said sheath movable to a position exposing said wrench surface when the pressure responsive member is not subjected to a pressure differential thereacross.

2. The connector of claim 1 wherein the plug has a bleed passageway which is exposed to the exterior of the port when the plug is partially removed to bleed fluid within the members to atmosphere.

3. The connector of claim 1 wherein a free floating piston is provided in said passage means and an incompressible fluid is provided between said piston and said pressure responsive member.

4. The connector of claims 1, 2 or 3 wherein the sheath is rotatable relative to the pressure responsive member and when the pressure responsive member is pressurized overlies all surfaces of the plug and pressure responsive member which might be engaged by a wrench to rotate the plug.

5. The connector of claims 1, 2 or 3 in which the plug includes a body,
said passage means extends through said body and opens to the side wall thereof,
a cap is threadedly connected to one end of the body,
a friction drive plug is carried by the cap and overlies and conceals said threaded connection between the cap and plug,
said cap having a depending skirt providing an annulus between the cap and plug body in which the pressure responsive member is slidingly and sealingly received,
said wrench surface is provided on said plug body,
said sheath overlies said wrench surface and said cap when the pressure responsive member is subjected to a differential thereacross,
and said sheath is rotatable relative to said body and said cap.

6. As a subcombination a plug having threads on one end thereof and adapted to be received in a threaded port,
a wrench surface on the plug,
a pressure responsive member carried by the plug and slidable relative thereto,
passage means in the plug exposing the pressure responsive member to pressure conditions at the threaded end of the plug, and a sheath carried by said pressure responsive member and movable axially therewith,
said pressure responsive member maintaining said sheath over said wrench surface when said passageway is pressurized,
said sheath movable to a position exposing said wrench surface when the pressure responsive member is not subjected to a pressure differential thereacross.

7. The connector of claim 6 wherein the plug has a bleed passageway which is exposed to the exterior of the port when the plug is partially removed to bleed fluid within the members to atmosphere.

8. The connector of claim 6 wherein a free floating piston is provided in said passage means and an incompressible fluid is provided between said plug and said pressure responsive member.

9. The connector of claims 6, 7 or 8 wherein the sheath is rotatable relative to the pressure responsive member and when the pressure responsive member is pressurized overlies all surfaces of the plug which might be engaged by a wrench to rotate the plug.

10. The connector of claims 6, 7 or 8 in which the plug includes a body,
said passage means extends through said body and opens to the side wall thereof,
a cap is threadedly connected to one end of the body,
a friction drive plug is carried by the cap and overlies and conceals said threaded connection between the cap and plug,
said cap having a depending skirt providing an annulus between the cap and plug body in which the pressure responsive member is slidingly and sealingly received,
said wrench surface is provided on said plug body,
said sheath overlies said wrench surface and said cap when the pressure responsive member is subjected to a differential thereacross,
and said sheath is rotatable relative to said body and said cap.

* * * * *